US012172333B2

(12) United States Patent
Huang

(10) Patent No.: US 12,172,333 B2
(45) Date of Patent: Dec. 24, 2024

(54) UTILITY KNIFE

(71) Applicant: ORANGE HARDWARE COMPANY, Taichung (TW)

(72) Inventor: Tien-Yu Huang, Taichung (TW)

(73) Assignee: ORANGE HARDWARE COMPANY, Taichung (TW)

( * ) Notice: Subject to any disclaimer, the term of this patent is extended or adjusted under 35 U.S.C. 154(b) by 271 days.

(21) Appl. No.: 17/883,404

(22) Filed: Aug. 8, 2022

(65) Prior Publication Data

US 2024/0042631 A1 Feb. 8, 2024

(51) Int. Cl.
*B26B 5/00* (2006.01)

(52) U.S. Cl.
CPC .................................... *B26B 5/003* (2013.01)

(58) Field of Classification Search
CPC ........... B26B 5/003; B26B 5/001; B26B 1/08; B26B 1/10
USPC ... 30/162, 154, 164, 151, 272.1, 2.329, 335, 30/336, 337
See application file for complete search history.

(56) References Cited

U.S. PATENT DOCUMENTS

| | | | | | |
|---|---|---|---|---|---|
| 4,713,885 | A * | 12/1987 | Keklak | B26B 5/003 30/162 |
| 5,426,855 | A * | 6/1995 | Keklak | B26B 5/003 30/162 |
| 10,245,736 | B2 * | 4/2019 | Huang | B26B 5/001 |
| 11,565,432 | B2 * | 1/2023 | Rohrbach | B26B 5/001 |
| 2004/0237312 | A1 * | 12/2004 | Hernandez | B26B 5/003 30/162 |
| 2016/0325442 | A1 * | 11/2016 | Herlitz | B26B 1/08 |
| 2018/0311839 | A1 * | 11/2018 | Huang | B26B 5/001 |
| 2021/0178616 | A1 * | 6/2021 | Liu | B26B 5/003 |

* cited by examiner

*Primary Examiner* — Ghassem Alie

(57) ABSTRACT

A utility knife includes a shell; a swingable lever pivoted to the shell and protrusive outside the shell; a blade carrier with a notch, slidably disposed in the shell; a linkage mechanism with linkages rotatably connected to one another, two of the linkages rotatably connected to the shell and the blade carrier, respectively; an elastic recovery mechanism connected with the blade carrier and the shell; and a safety member with a projection, movably disposed on the shell. When the projection is located within the notch, the blade carrier is blocked by the projection and non-movable relative to the shell. When the projection is located out of the notch and the linkage mechanism is driven by the swingable lever to push the blade carrier, the blade carrier is movable relative to the shell.

7 Claims, 10 Drawing Sheets

UTILITY KNIFE

BACKGROUND OF THE INVENTION

Field of the Invention

The present invention relates to a utility knife.

Description of the Prior Art

Usually, a utility knife is light, sharp and convenient to cut objects, and the utility knife is widely used. The conventional utility knife generally includes a long blade carrier, a blade disposed on the blade carrier and a controller which can be pushed and pulled by a user's finger. Through the user's finger pushing or pulling the controller, the controller controls the blade to move forward or backward inside the blade carrier; that is, the blade can be moved forward to project an edge out of the blade carrier, or the blade can be moved backward to retreat back to the blade carrier.

However, in this conventional structure, the user has to push and pull the controller by finger when using the utility knife, which is inconvenient. In addition, In addition, the conventional utility knife is generally lack of safety mechanism for preventing unintentional operation of projecting the blade, which is dangerous and can result in injury to the user.

The present invention is, therefore, arisen to obviate or at least mitigate the above-mentioned disadvantages.

SUMMARY OF THE INVENTION

The main object of the present invention is to provide a utility knife with a safety mechanism for preventing unintentional operation.

To achieve the above and other objects, a utility knife is provided, including: a shell; a swingable lever, pivoted to the shell and protrusive outside the shell for being operated externally; a blade carrier, slidably disposed in the shell and configured to carry a blade, including a notch; a linkage mechanism, including a plurality of linkages rotatably connected to one another, two of the plurality of linkages rotatably connected to the shell and the blade carrier, respectively; an elastic recovery mechanism, connected with the blade carrier and the shell; and a safety member, movably disposed on the shell, including a projection; wherein when the projection is located within the notch, the blade carrier is blocked by the projection and non-movable relative to the shell; when the projection is located out of the notch and the linkage mechanism is driven by the swingable lever to push the blade carrier, the blade carrier is movable relative to the shell to project out from the shell.

The present invention will become more obvious from the following description when taken in connection with the accompanying drawings, which show, for purpose of illustrations only, the preferred embodiment(s) in accordance with the present invention.

DETAILED DESCRIPTION OF THE PREFERRED EMBODIMENTS

Figure 1:
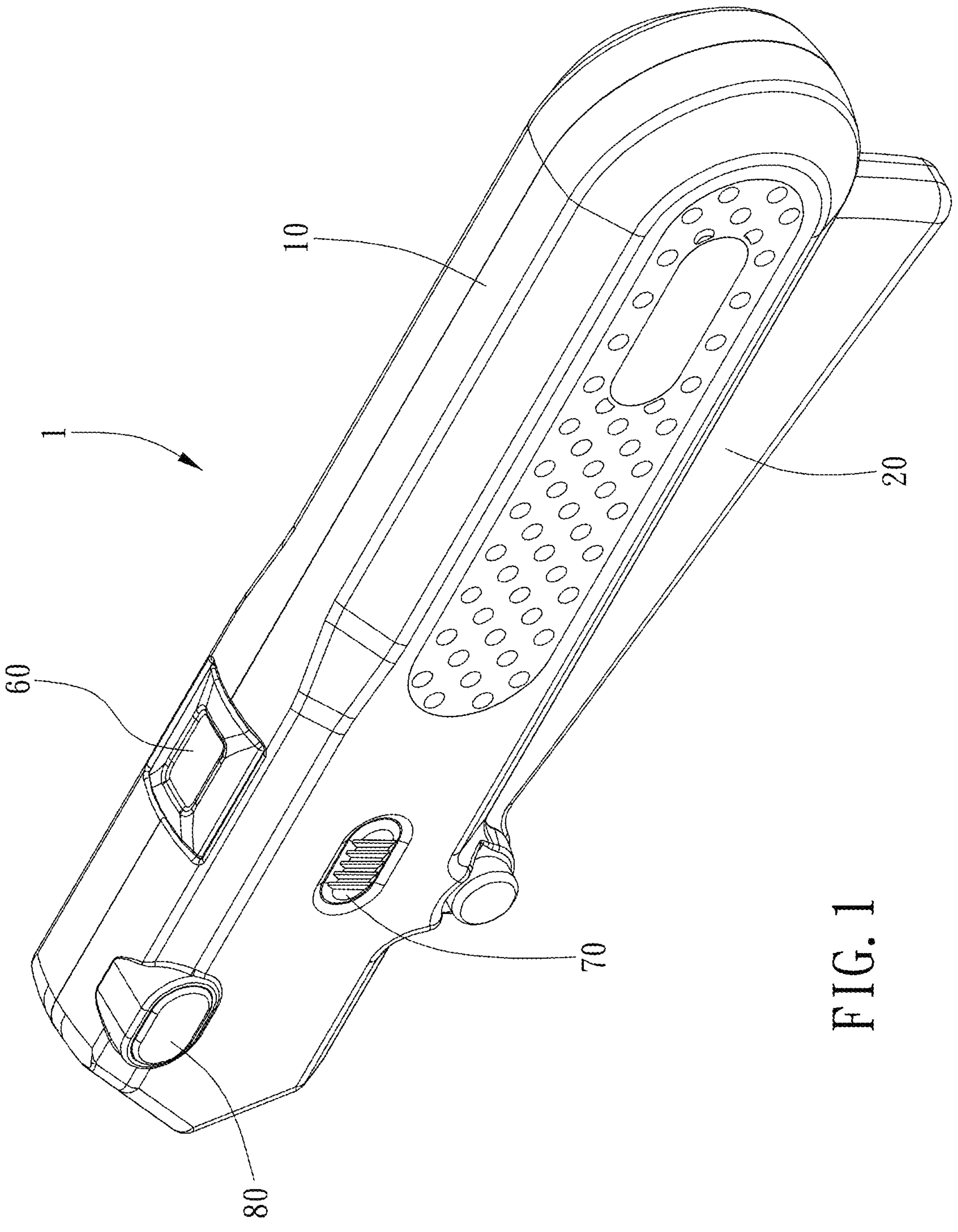
FIG. 1 is a stereogram of a preferable embodiment of the present invention.
Figure 2:
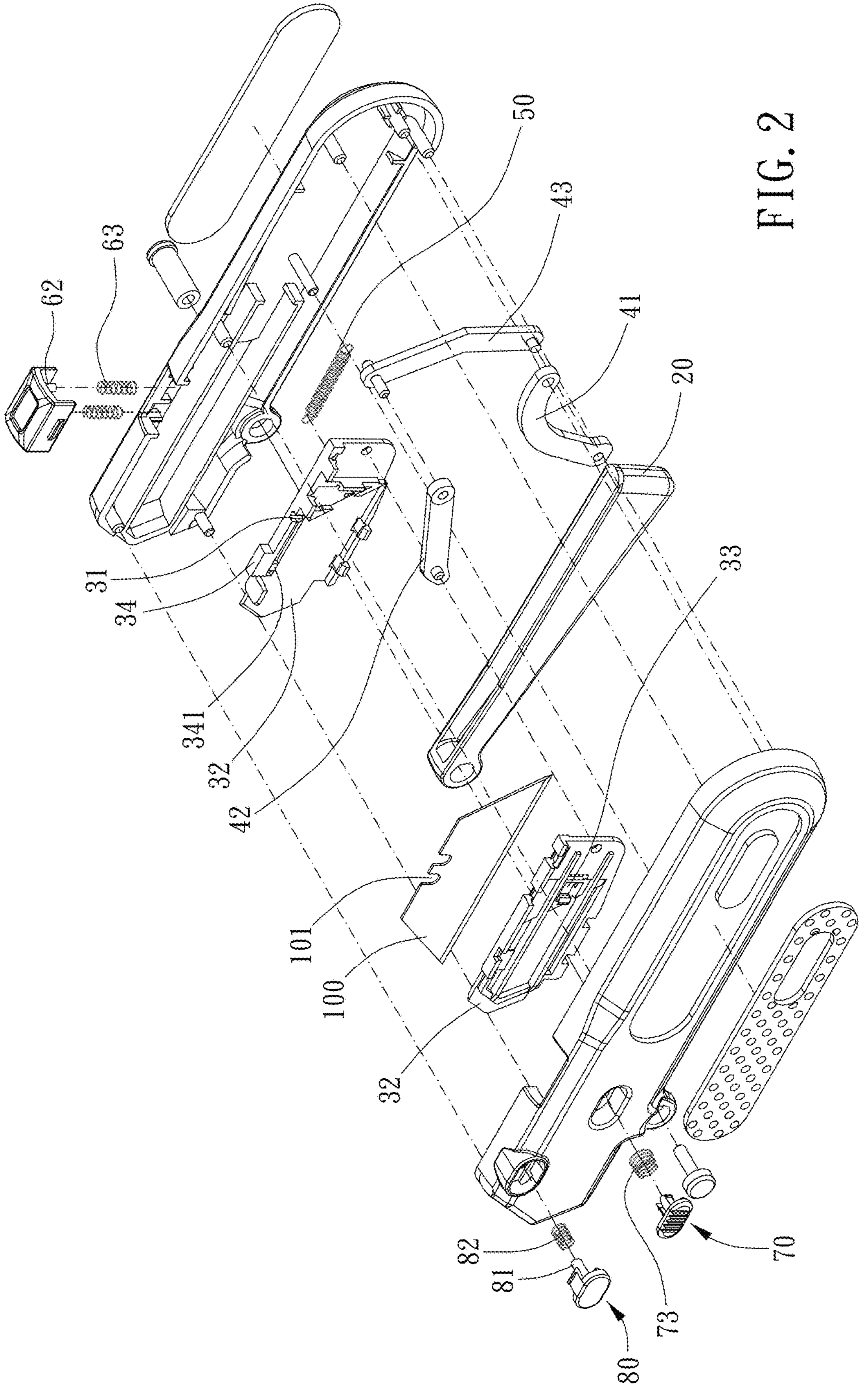
FIG. 2 is a breakdown drawing of a preferable embodiment of the present invention.
Figure 3:
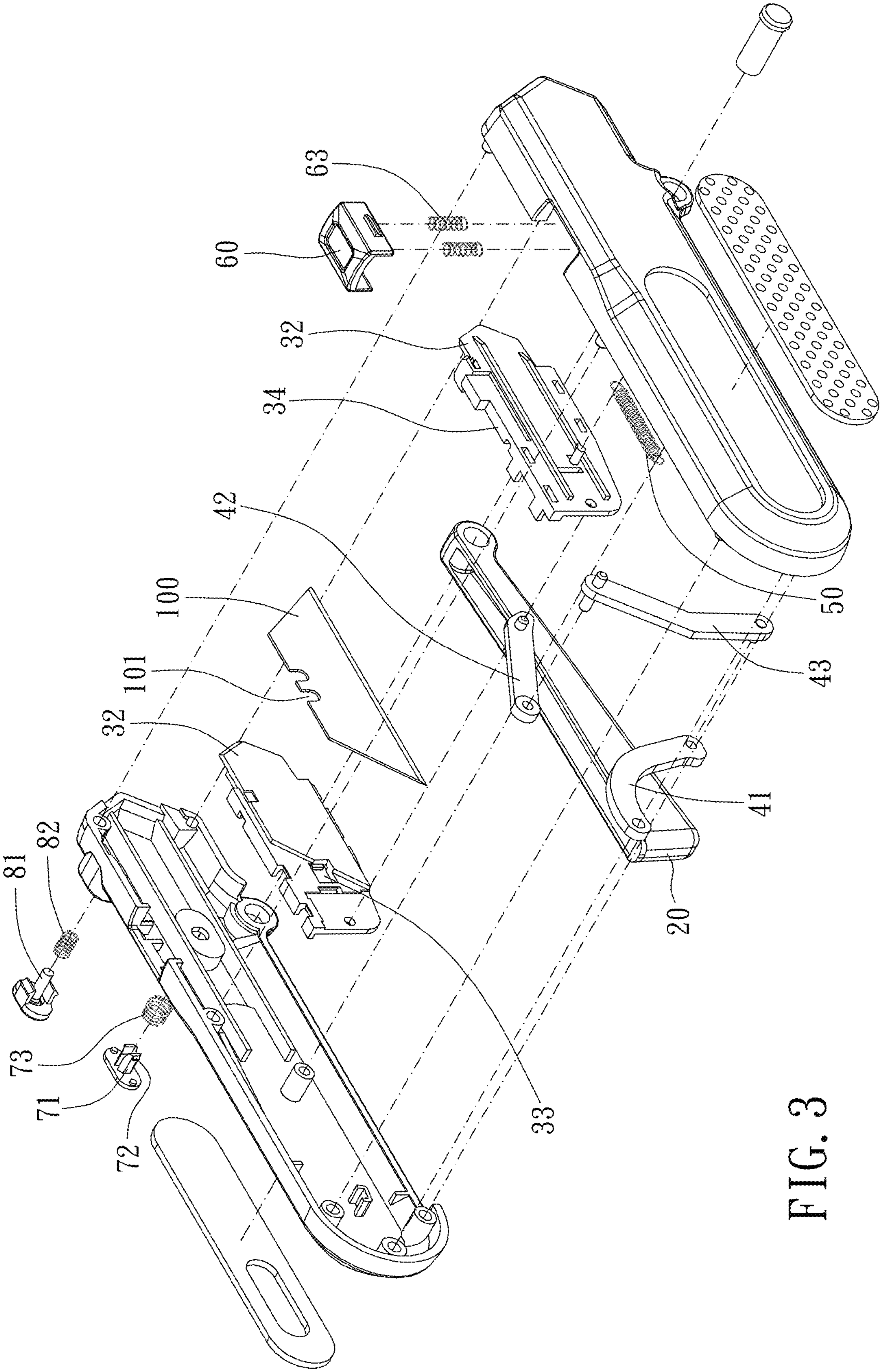
FIG. 3 is another breakdown drawing of a preferable embodiment of the present invention.
Figure 4:
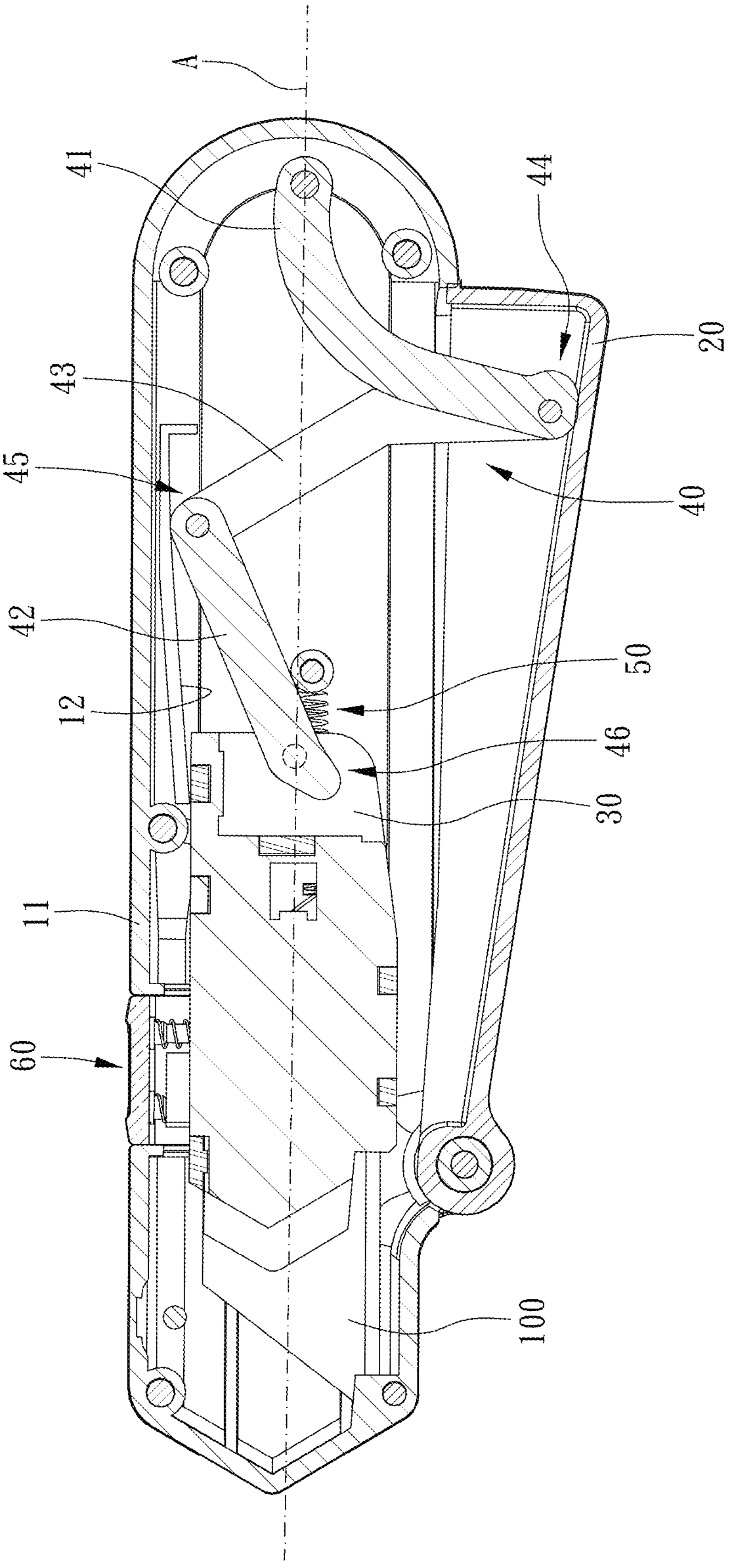
FIGS. 4 and 5 are cross-sectional views showing operation of a preferable embodiment of the present invention.

Please refer to FIGS. 1 to 10 for a preferable embodiment of the present invention. A utility knife 1 of the present invention includes a shell 10, a swingable lever 20, a blade carrier 30, a linkage mechanism 40, an elastic recovery mechanism and a safety member 60.

Figure 5:
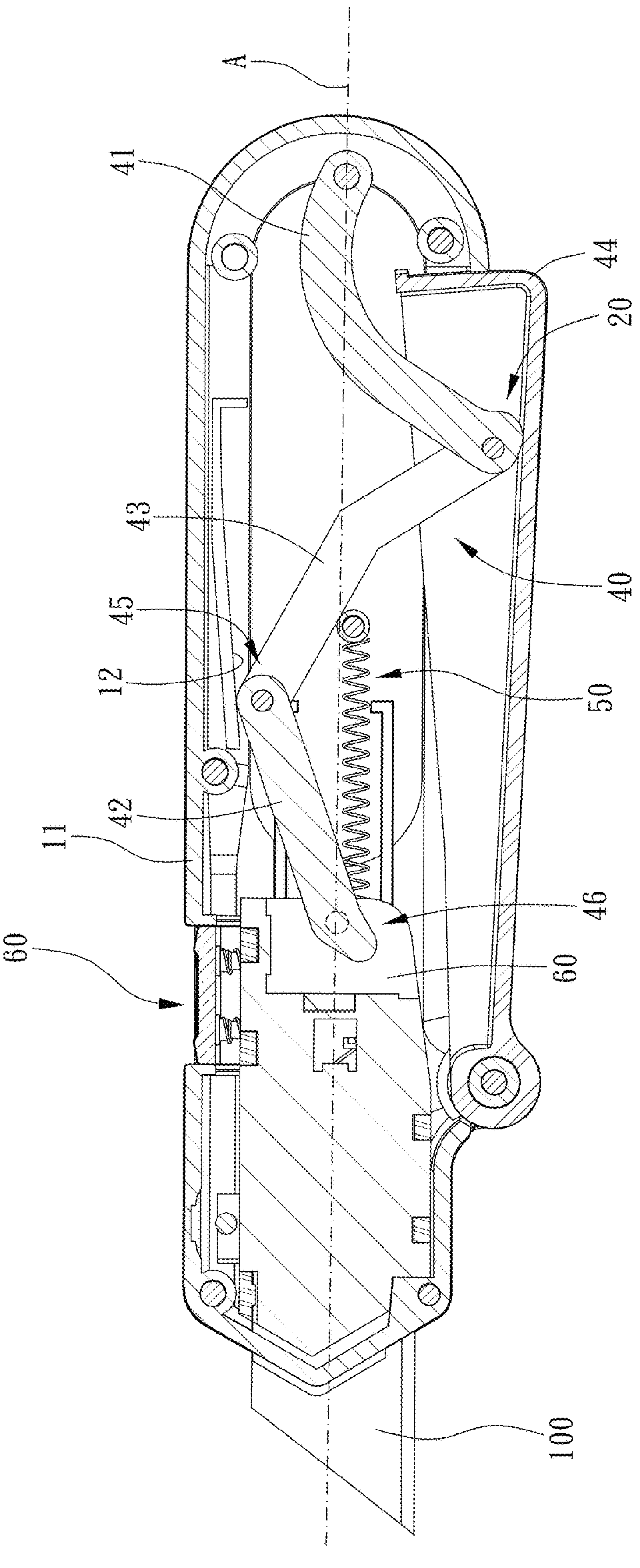
Figure 6:
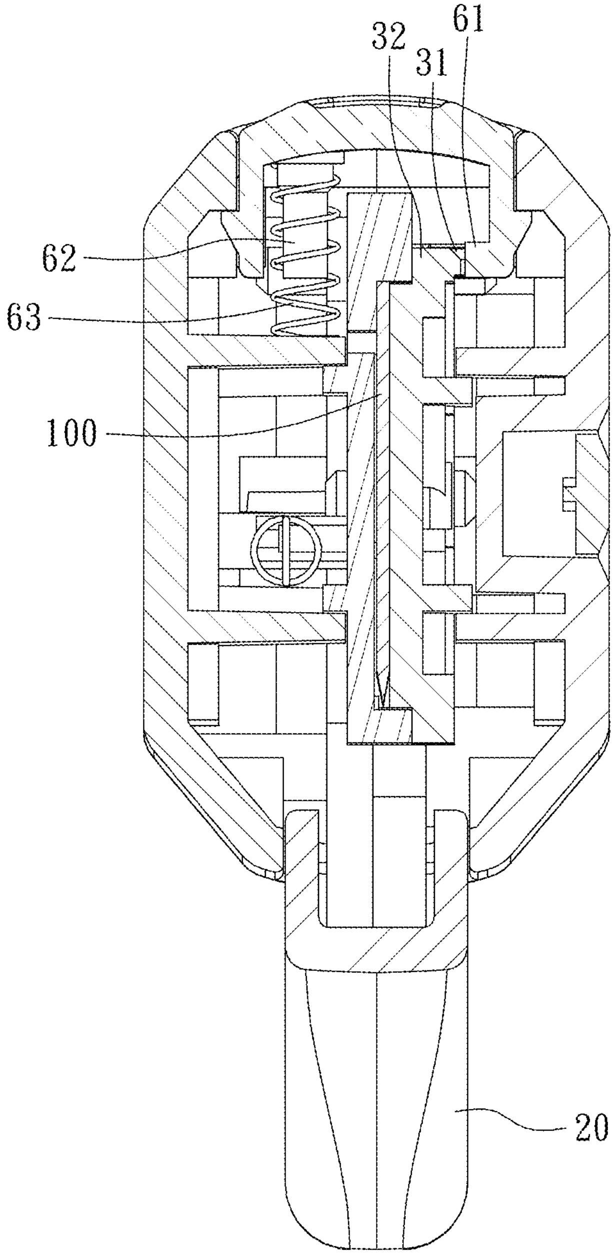
FIGS. 6 to 8 are cross-sectional views showing operation of unlocking a utility knife of a preferable embodiment of the present invention.
Figure 7:
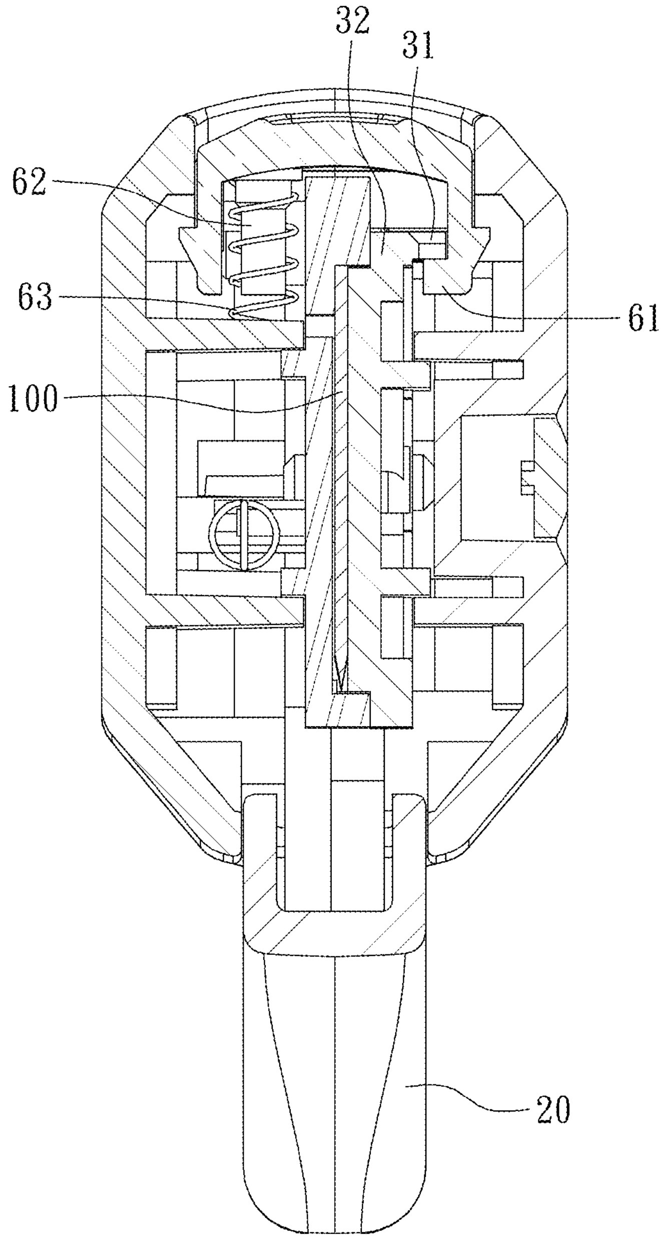
Figure 8:
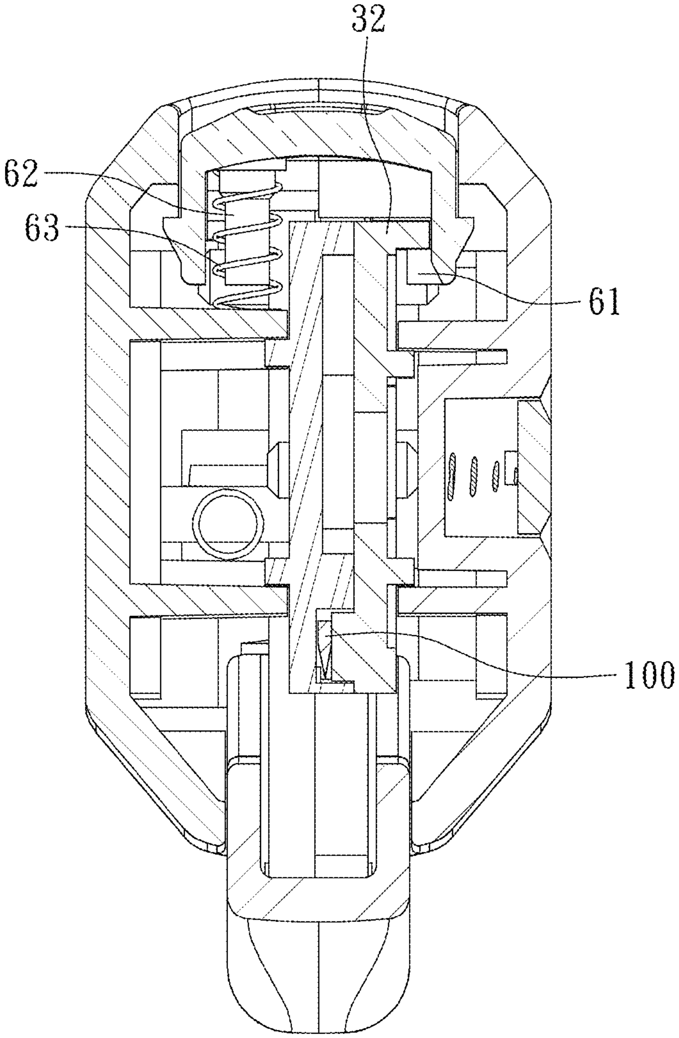
Figure 9:
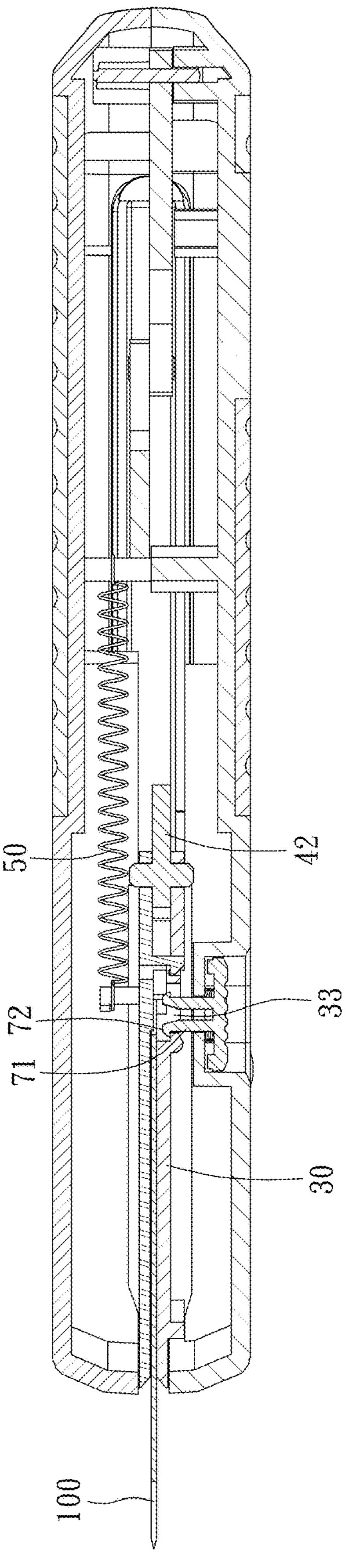
FIG. 9 is a cross-sectional view showing operation of a restriction mechanism according to a preferable embodiment of the present invention.
Figure 10:
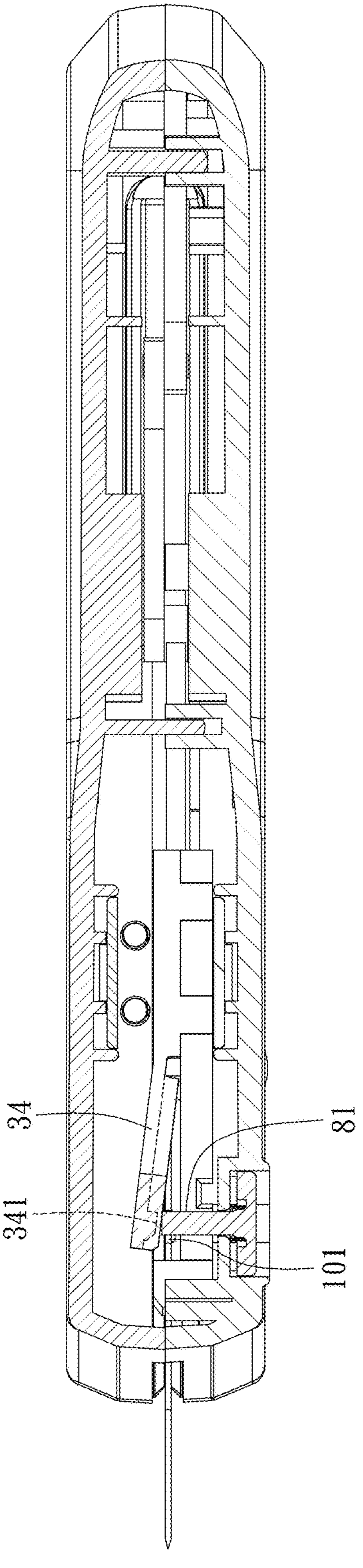
FIG. 10 is a cross-sectional view showing operation of an urging mechanism according to a preferable embodiment of the present invention.

The swingable lever 20 is pivoted to the shell 10 and protrusive outside the shell 10 for being operated externally. The blade carrier 30 is slidably disposed in the shell 10 and configured to carry a blade 100, and the blade carrier 30 includes a notch 31. The linkage mechanism 40 includes a plurality of linkages which include a first, second and third linkages 41, 42, 43 rotatably connected to one another, and two of the plurality of linkages are rotatably connected to the shell 10 and the blade carrier 30, respectively. The elastic recovery mechanism 50 is connected with the blade carrier 30 and the shell 10. The safety member 60 is movably disposed on the shell 10, and the safety member 60 includes a projection 61. When the projection 61 is located within the notch 31 (FIG. 6), the blade carrier 30 is blocked by the projection 61 and non-movable relative to the shell 10. When the projection 61 is located out of the notch 31 (FIG. 7) and the linkage mechanism 40 is driven by the swingable lever 20 to push the blade carrier 30, the blade carrier 30 is movable relative to the shell 10 to project out from the shell 10 (FIGS. 5 and 8). As such, it can prevent unintentional operation and it is safe to use, and it can avoid injury to the user.

The safety member 60 is disposed through an upper wall 11 of the shell 10 and further includes at least one column 62, at least one elastic member 63 is sleeved around the at least one column 62 and abutted against and between the safety member 60 and the shell 10, and the safety member 60 is normally biased by the at least one elastic member 63 so that the projection 61 is releasably retained within the notch 31.

Specifically, the blade carrier 30 includes two half portions 32 detachably connected to each other and configured to hold the blade 100 therebetween. The first linkage 41 is rotatably connected to the shell 10, the second linkage 42 is rotatably connected to the blade carrier 30, and the third linkage 43 is rotatably connected to and between the first linkage 41 and the second linkage 42. At least one of the first linkage 41 and the second linkage 42 is abutted against the swingable lever 20 so that swinging of the swingable lever 20 can drive the linkage mechanism 40 to move.

A first interconnection portion 44 at which the first linkage 41 and the third linkage 43 are rotatably connected to each other is abutted against the swingable lever 20, and a second interconnection portion 45 at which the second linkage 42 and the third linkage 43 are rotatably connected to each other is abutted against the shell 10. The shell 10 includes an inclined surface 12 which extends gradually close to a longitudinal central axis A in a direction from a rear end to a front end of the utility knife 1, and the second interconnection portion 45 is abutted against the inclined surface 12 so that it can effectively drive the linkage mechanism 40.

The third linkage 43 is rotatably connected to and between the two half portions 32, the first linkage 41 and the third linkage 43 are connected in a V-shaped configuration, and relative to the V-shaped configuration the second linkage 42 and the third linkage 43 are connected in a reversed V-shaped configuration. Relative to the swingable lever 20, the second interconnection portion 45 is higher than a third interconnection portion 46 at which the second linkage 42 and the blade carrier 30 are rotatably connected to each other, which is effective and smooth to operate the swingable lever 20 to drive the blade carrier 30.

Specifically, the utility knife 1 preferably further includes a restriction mechanism 70, wherein the restriction mechanism 70 includes at least one leg 71 disposed laterally through the shell 10 and including at least one hooked end 72 disposed on the at least one leg 71, the blade carrier 30 includes an engaging hole 33, and when the blade carrier 30 moves and the engaging hole 33 corresponds to the at least one leg 71, the at least one hooked end 72 can be inserted in the engaging hole 33 and be hooked on the blade carrier 30 (FIG. 9) so that the blade carrier 30 is restricted in position (for easy use and/or replacement of the blade 100).

In this embodiment, the engaging hole 33 is a through hole, the engaging hole 33 and the at least one leg 71 are each configured to overlap with a part of the blade 100, wherein the blade 100 can serve as a stop to prevent overinsertion of the at least one leg 71. Preferably, a spring 73 is sleeved around the at least one leg 71 and abutted between the restriction mechanism 70 and the shell 10 so that the restriction mechanism 70 is recoverable automatically when the at least one leg 71 disengaged from the blade carrier 30.

Specifically, the utility knife 1 preferably further includes an urging mechanism 80, wherein the urging mechanism 80 is disposed laterally through the shell 10, and the blade carrier 30 further includes an elastic arm 34 which includes at least one protrusion 341 configured to be engaged within at least one recess 101 of the blade 100 for positioning the blade 100. Preferably, a spring 82 is sleeved around a shaft 81 of the urging mechanism 80 and abutted between the urging mechanism 80 and the shell 10 so that the urging mechanism 80 is recoverable automatically. The urging mechanism 80 is configured to be moved so that the shaft 81 urge the elastic arm 34 to disengage the at least one protrusion 341 laterally from the at least one recess 101 (FIG. 10) so that the blade 100 is removable from the blade carrier 30.

Although particular embodiments of the invention have been described in detail for purposes of illustration, various modifications and enhancements may be made without departing from the spirit and scope of the invention. Accordingly, the invention is not to be limited except as by the appended claims.

What is claimed is:

1. A utility knife, including:

a shell;

a swingable lever, pivoted to the shell and protrusive outside the shell for being operated externally;

a blade carrier, slidably disposed in the shell and configured to carry a blade, including a notch;

a linkage mechanism, including a plurality of linkages rotatably connected to one another, two of the plurality of linkages rotatably connected to the shell and the blade carrier, respectively;

an elastic recovery mechanism, connected with the blade carrier and the shell; and a safety member, movably disposed on the shell, including a projection;

wherein when the projection is located within the notch, the blade carrier is blocked by the projection and non-movable relative to the shell; when the projection is located out of the notch and the linkage mechanism is driven by the swingable lever to push the blade carrier, the blade carrier is movable relative to the shell so that the blade projects from the shell;

wherein the utility knife further includes a restriction mechanism, the restriction mechanism includes at least one leg disposed laterally through the shell and includes at least one hooked end disposed on the at least one leg, the blade carrier further includes an engaging hole, and when the blade carrier moves and the engaging hole corresponds to the at least one leg, the at least one hooked end can be inserted in the engaging hole and be hooked on the blade carrier so that the blade carrier is restricted in position;

wherein a spring is sleeved around the at least one leg and abutted between the restriction mechanism and the shell;

wherein the utility knife further includes an urging mechanism, the urging mechanism is disposed laterally through the shell, the blade carrier includes an elastic arm which includes at least one protrusion configured to be engaged within at least one recess of the blade for positioning the blade, and the urging mechanism is configured to be moved to urge the elastic arm to disengage the at least one protrusion from the at least one recess so that the blade is removable from the blade carrier;

wherein another spring is sleeved around a shaft of the urging mechanism and abutted between the urging mechanism and the shell;

wherein the safety member is disposed through an upper wall of the shell and further includes at least one column, at least one elastic member is sleeved around the column and abutted against and between the safety member and the shell, and the safety member is normally biased by the at least one elastic member so that the projection is releasably retained within the notch.

2. The utility knife of claim 1, wherein the blade carrier includes two half portions detachably connected to each other and configured to position the blade therebetween.

3. The utility knife of claim 1, wherein the plurality of linkages include a first linkage rotatably connected to the shell, a second linkage rotatably connected to the blade carrier, and a third linkage rotatably connected to and between the first linkage and the second linkage, and at least one of the first linkage and the second linkage is abutted against the swingable lever.

4. The utility knife of claim 3, wherein a first interconnection portion at which the first linkage and the third linkage are rotatably connected to each other is abutted against the swingable lever, and a second interconnection portion at which the second linkage and the third linkage are rotatably connected to each other is abutted against the shell.

5. The utility knife of claim 4, wherein the shell includes an inclined surface which extends gradually close to a longitudinal central axis in a direction from a rear end to a front end of the utility knife, and the second interconnection portion is abutted against the inclined surface.

6. The utility knife of claim 5, wherein the blade carrier includes two half portions detachably connected to each other and configured to position the blade therebetween; the third linkage is rotatably connected to and between the two half portions; the first linkage and the third linkage are connected in a V-shaped configuration, the second linkage and the third linkage are connected in a reversed V-shaped configuration; relative to the swingable lever, the second interconnection portion is higher than a third interconnection portion at which the second linkage and the blade carrier are rotatably connected to each other.

7. The utility knife of claim 1, wherein the engaging hole is a through hole, the engaging hole and the at least one leg are each configured to overlap with a part of the blade.

* * * * *